United States Patent
Borner

[15] 3,638,201

[45] Jan. 25, 1972

[54] OPTICAL DATA STORAGE SYSTEM

[72] Inventor: Manfred Borner, Ulm (Danube), Germany

[73] Assignee: Licentia Patent-Verwaltungs GmbH, Frankfurt am Main, Germany

[22] Filed: June 29, 1970

[21] Appl. No.: 50,607

[30] Foreign Application Priority Data

June 28, 1968 Germany ....................P 19 32 840.6

[52] U.S. Cl. ................340/173 LM, 340/146.1, 340/146.3, 350/160, 356/71

[51] Int. Cl. ....................................................G11c 13/04

[58] Field of Search .........340/146.1, 146.3, 173 LS, 173 PP, 340/173 LM, 173 CC; 356/71, 257; 350/160

[56] References Cited

UNITED STATES PATENTS 3,387,140 6/1968 Roth et al. ....................340/173 CC 3,466,616 9/1969 Bron ..............................340/173 CC 3,532,426 10/1970 Lemmond ...............................356/71

*Primary Examiner*—Terrell W. Fears

*Attorney*—Spencer & Kaye

[57] ABSTRACT

Damaged or faulty areas of an optical recording medium of the type wherein the data is recorded by means of selective discolorations caused by a writing light beam of a first wavelength are detected by utilizing a control beam of light in addition to the usual readout light beam during the optical nondestructive readout of the data. The control beam has a wavelength which is different from that of the readout beam and will not be absorbed by the discolored portions of the recording medium. The control beam and the readout beam are separately detected and those portions of the recording medium which produce modulation of both the reading and control beams as the result of absorption of both beams are identified as being damaged.

4 Claims, 2 Drawing Figures

Inventor:
Manfred Börner

BY Spencer & Kaye
ATTORNEYS.

OPTICAL DATA STORAGE SYSTEM

BACKGROUND OF THE INVENTION

The present invention relates to an improved data storage system in which the recording substance utilized as the storage medium changes color during recording under the influence of high-energy light beams, preferably produced by a laser, and which can be read out nondestructively by means of reading beams of light of another wavelength. More particularly this invention relates to an improved data storage system of this type wherein damaged or faulty information-bearing portions of the recording or storage medium may be detected.

Modern computer systems require correspondingly large storage devices. In addition to magnetic tape memories which are of an undesirably large size in their spatial expansion, so-called optical memories have lately come into use. Such optical memories are provided with substances which change in their radiation permeability under the influence of light radiation, particularly, high-energy laser beams, and which thus can be utilized for data storage.

Two groups of optical memories can easily be distinguished. In the first group, thin layers of an opaque recording substance, e.g., metal, are applied to carriers of a different type of material and are perforated by the laser beams in the timing pattern of the data flow.

In the other group the recording substances applied to the carrier are usually of an organic nature and are changed in color, i.e., discolored, by the laser beams, which are usually in the ultraviolet range according to the timing pattern of the data flow. An example of an organic substance which can be utilized in this manner is disclosed in German published application 1,274,655 issued Aug. 8, 1968. Further examples are given in Wissenschaftliche Berichte AEG-Telefunken 42 (1969) 1, pages 17–23.

Both methods have in common that they are capable of an extraordinarily high recording density, thus permitting the size of the memory to be substantially reduced.

Both methods further exhibit the common feature that light beams are also employed for reading out the memory. Since light beams are used both for writing and reading data in such memories, the susceptibility of the system to malfunctions as a result of erroneous data caused by dust or scratches of the storage medium is very great.

SUMMARY OF THE INVENTION

It is therefore the object of the present invention to provide a data storage system in which malfunctions of the above-mentioned type can be recognized as such. In particular it is the object of the present invention to provide an improved data storage system of the type utilizing a recording medium of the type which changes color due to the impingement of light of a certain wavelength wherein damaged or faulty portions of the recording medium may be easily identified. It is to be understood that as used here in the terms "damaged" and "faulty" are intended to include any undesired manner or object, e.g., scratches, dust, etc., which changes the radiation permeability of the storage medium and not to include the manner of changing the radiation permeability specifically utilized to perform the writing of information in the storage medium.

The above objects are achieved according to the present invention, in that in a data storage system in which a substance is utilized as the storage medium which changes color during recording under the influence of high-energy laser beams and which can be nondestructively read out by means of readout beams of a different wavelength which will be absorbed by the discolored portions of the recording medium, the recording medium is simultaneously subjected, during readout, to the readout beam and to an additional control beam whose wavelength is so selected that it is not absorbed by the discolorations produced during the recording process. The control beams are separately detected and those portions of the recording medium which absorb both the reading and the control beams are considered to be malfunctioning. In particular, the control beams are detected and an error signal is produced whenever the received control beam contains a modulation indicating that absorption thereof has occurred in the record medium.

DETAILED DESCRIPTION OF THE INVENTION

Figure 1:
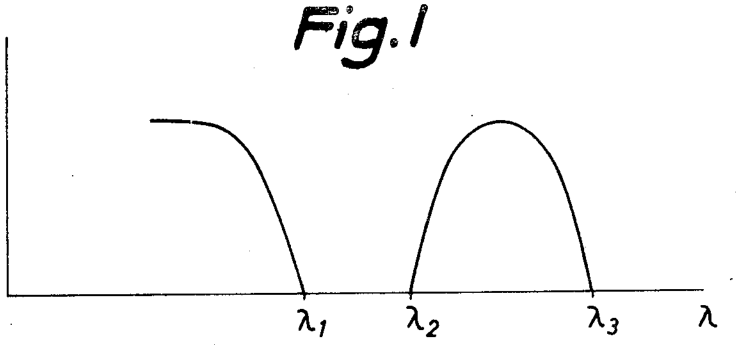
FIG. 1 is a schematic plot of the degree of absorption vs. wavelength for a typical organic recording substance of the type to which the invention is directed.

The present invention is based on the realization that the above-mentioned organic-type recording substances show a discoloration during the irradiation which accompanies the recording process, which discoloration does not extend uniformly over the entire spectral range of the reading light. Rather there result absorption maxima as is schematically indicated in FIG. 1 wherein the wavelength is plotted as the abscissa and the degree of absorption of the discolored portion of the layer of organic recording material is plotted as the ordinate.

The beams initiating the discoloration have a wavelength which is below the wavelength $\lambda_1$. Within the range $\lambda_2$ to $\lambda_3$, which range is at some distance from $\lambda_1$, an absorption maximum occurs. The reading beams are therefore advisably selected in this range. In any case, in order that the readout be nondestructive of the stored information the readout beams must have a wavelength greater than that of $\lambda_1$. According to the present invention, during the reading out of information, the recording medium is subjected not only to the reading beam, but to an additional control beam of a wavelength which lies outside of the range of the absorption maximum and of course will not cause a discoloration of the recording medium. Since due to their wavelength these control beams will not be influenced by the discoloration they thus pass unmodulated through the recording medium to a detector.

If, however, scratches or dust particles are present on the recording medium, the control beams will be absorbed by them. The undamaged information recording is thus clearly distinguished by a modulation of the reading beams and nonmodulation of the control beams. On the other hand however, modulation of the control beams indicates the presence of a malfunction.

Figure 2:
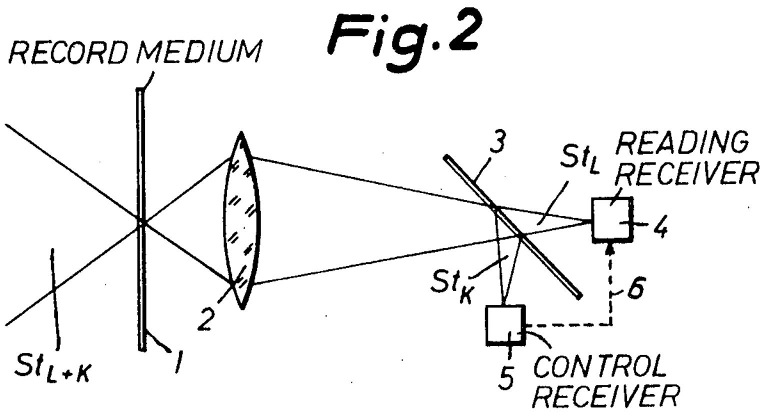
FIG. 2 is a schematic block diagram of one embodiment of a system for carrying out the invention.

FIG. 2 shows a schematic system arrangement for checking the readout process for malfunctions by dust or scratches according to the invention. The recording medium 1 containing the stored information in the form of selective discolorations is subjected during the readout process to a combined beam of light ($St_{L+K}$) consisting of the reading beam $St_L$ and the control beam $St_K$. After passing through the record medium 1, the combined reading and control beams are focused, for example by means of a lens 2. In order to separate the reading and control beams, a semipermeable mirror 3 is provided in the path of the focused light. The semipermeable mirror to be employed for this purpose is preferably constructed as a beam divider in such a manner that it permits light beams of the one wavelength to pass with very little damping and almost completely reflects light beams of another wavelength. In the present case, the reading beams $St_L$ are permitted to pass through the mirror 3 while the control beams $St_K$ are reflected. It is to be understood however, the reverse arrangement is also possible depending on the type of mirror 3 at hand. Mirrors of the required type have been long known in the art and are manufactured, for example, by Oriel, Optics Corporation, Bruchwiesenstr. 17, 61 Darmstadt, Germany.

The reading beams $St_L$ are detected, after separation in mirror 3, by means of a reading receiver 4 and the control beams $St_K$ are directed to a and detected by a control receiver 5. The control receiver evaluates the detected beam for modulation thereof and only such information received by read receiver 4 which is simultaneously accompanied by noninterruption or nonmodulation of the beams $St_K$ received by control receiver 5 is considered to be valid or undamaged and is to be evaluated by the system. The control receiver 5 performs this function by providing an error signal whenever control beams $St_K$ which are interrupted or modulated are detected, which error signal is fed to the reading receiver 4 to block the corresponding signals $St_L$ and identify as unusable. This function is schematically indicated by the dashed connecting line 6 between reading receiver 4 and control receiver 5.

EXAMPLE

For a compound within the formula 3'-n-Amyl-b'-methoxy-spiro-[3H-naphtho (2,1-b) pyran-3,2'-2H-benzo (1) pyran] as cited in the above-mentioned German published application 1, 274, 655 the wavelengths $\lambda_1$, $\lambda_2$ and $\lambda_3$ are $\lambda_1 < 360$ nm., $\lambda_2 \approx 460$ nm., $\lambda_3 \approx 680$ nm. The wavelength of the control beams will be $> 680$ nm. or between $\lambda_1$ and $\lambda_2$ in this example.

It will be understood that the above description of the present invention is susceptible to various modifications, changes and adaptations and the same are intended to be comprehended within the meaning and range of equivalents of the appended claims.

I claim:

1. In a data storage system in which data are recorded on a storage medium by means of color changes thereof caused by the impingement of high-energy laser beams and is nondestructively read out by means of light beams of a wavelength different from that of the recording beams, which will not cause color changes in said recording medium and will be at least partially absorbed by the changed color portion of the recording medium, the method of determining faulty portions of said recording medium during readout comprising:

during the readout of the stored information, simultaneously exposing said recording medium to an additional control beam of light of a wavelength which will not cause color changes of said recording medium and will not be absorbed by the discolorations produced on the recording medium during the recording process;

separately detecting said control beam of light; and providing an error signal whenever a modulated control beam, indicating absorption of said control beam by the particular portion of the recording medium being readout, is detected, whereby said error signal is an indication that said particular portion of said recording medium is damaged or provides faulty information.

2. The method of claim 1 further including utilizing said error signal to control the detector for said reading beam.

3. In a data storage system in which data are recorded on a storage medium by means of color changes thereof caused by the selective impingement at portions thereof of a beam of light of a first wavelength and is nondestructively read out by means of light beams of a second wavelength, different from that of said first wavelength, which will not cause color changes in said recording medium and will be at least partially absorbed by the changed or discolored portions of said recording medium, the improvement wherein said system includes means for detecting a faulty discolored portion of said record medium during readout comprising:

means, operative during the reading out of data from the record medium, for simultaneously subjecting the portion of the record medium being read to a control beam of light of a wavelength which will not cause discoloration in said recording medium and will not be absorbed by the discolored portions of said record medium;

means for detecting said control beam and for producing an error signal whenever the detected control beam indicates that absorption thereof by the particular discolored portion of said record medium being readout has occurred.

4. The data system as defined in claim 3 including means, coupling the output of said detecting means to the detecting means in said system for the reading beam, for blocking the received signals from the particular portion of said record medium being read whenever an error signal is produced.

* * * * *